United States Patent [19]
Jang et al.

[11] Patent Number: 5,993,895
[45] Date of Patent: Nov. 30, 1999

[54] METHOD FOR REDUCTION OF SINTER TEMPERATURES OF ANTIFERROELECTRIC, LEAD-BASED CERAMICS BY USE OF LITHIUM COMPOUND ADDITIONS AND CAPACITORS MADE WITH SUCH CERAMICS

[75] Inventors: Sei-Joo Jang; Joseph P. Dougherty; Wesley Hackenberger; MingFang Song; Steven Perini; Beth Jones, all of State College, Pa.

[73] Assignee: The Penn State Research Foundation, University Park, Pa.

[21] Appl. No.: 08/949,168

[22] Filed: Oct. 10, 1997

[51] Int. Cl.$^6$ .............................. B05D 3/02; B05D 1/36; H01G 4/06; A61N 1/39

[52] U.S. Cl. .................. 427/79; 427/126.3; 427/376.6; 427/376.1; 427/419.1; 29/25.41; 29/25.42; 607/119; 361/313

[58] Field of Search ................... 427/79, 126.3, 427/376.6, 376.1, 419.1; 361/313; 29/25.41, 25.42; 607/119

[56] References Cited

U.S. PATENT DOCUMENTS

| | | | |
|---|---|---|---|
| 4,324,750 | 4/1982 | Maher | 264/61 |
| 5,318,725 | 6/1994 | Sandhage | 252/520 |
| 5,545,184 | 8/1996 | Dougherty | 607/5 |
| 5,603,147 | 2/1997 | Bischoff et al. | 29/25.42 |

OTHER PUBLICATIONS

Fu et al., "Effects of doping pairs on the preparation and dielectricity of PLZT ceramics", Ferroelectrics, 67(2–4), abstract, pp. 93–102, 1986.

Ishchuk et al., "Mesoscopic inhomogeneities in $Pb0.85(Li1/2\,La\,1/2)0.15(Zr1-yTiy)O3$ solid solutions in the vicinity of FE–AFE phase stability boundary", Ferroelectrics, Letter Sect., 21(5/6), abstract, pp. 161–166, 1996.

*Primary Examiner*—Shrive Beck
*Assistant Examiner*—Michael Barr
*Attorney, Agent, or Firm*—Thomas J. Monahan

[57] ABSTRACT

A method for densifying a dielectric antiferroelectric material includes the steps of adding a compound which includes lithium to the dielectric material to create a mixture thereof. Thereafter, the mixture is heated to a temperature of not greater than about 1100° C. for a predetermined period to densify the mixture. It is preferred that the lithium compound be a lithium salt and that the dielectric material comprise a PLZT composition.

12 Claims, 2 Drawing Sheets

METHOD FOR REDUCTION OF SINTER TEMPERATURES OF ANTIFERROELECTRIC, LEAD-BASED CERAMICS BY USE OF LITHIUM COMPOUND ADDITIONS AND CAPACITORS MADE WITH SUCH CERAMICS

FIELD OF THE INVENTION

This invention relates to production of antiferroelectric, lead-based ceramics, capacitors made from such ceramics, and to defibrillators which make use of such capacitors. More particularly, the invention relates to a method which enables sintering of such ceramics at temperatures of about 1100° C. or below.

BACKGROUND OF THE INVENTION

Ferroelectric ceramics exhibit extremely high dielectric constant values at low electric fields. However, capacitors which utilize ferroelectric ceramic dielectrics exhibit a significant decrease in capacitance with increasing levels of applied electric field. More specifically, conventional ferroelectric capacitors store a larger portion of their total charge at low voltage, as compared with linear dielectric capacitors which maintain a constant capacitance, independent of applied voltage. Accordingly, such ferroelectrics have not been favored for high voltage applications.

Recently, energy storage capacitors utilizing antiferroelectric ceramic layers have been proposed for use in cardiac defibrillators. Such an application is disclosed in U.S. Pat. No. 5,545,184 to Dougherty, entitled "Cardiac Defibrillator with High Energy Storage Antiferroelectric Capacitor". Cardiac defibrillator applications require an applied voltage of approximately 800 volts, with an energy storage capacity of up to 40 Joules. A class of non-linear, anti-polar ceramic materials, termed antiferroelectrics, exhibit increasing dielectric constants as an applied electric field is increased. At a certain applied electric field, an antiferroelectric undergoes a phase transition to a ferroelectric phase (exhibiting a polar characteristic) and then shows a decrease in dielectric constant at even higher potentials.

The aforesaid Dougherty patent (U.S. Pat. No. 5,545,184) illustrates that capacitors with anti-ferroelectric dielectrics match the conditions required for defibrillation applications. In U.S. patent application Ser. No. 08/688,883 now U.S. Pat. No. 5,728,138, entitled "Cardiac Defibrillator with Multi-phase Ferroelectric/Antiferroelectric Capacitor", Dougherty et al. indicate that improved energy storage can be achieved in a capacitor employing antiferroelectric dielectric layers by applying an electric field across the dielectric layers which enables a transition thereof through both an antiferroelectric phase and plural ferroelectric phases.

In both of the aforementioned Dougherty teachings, the antiferroelectric dielectric ceramics have comprised lead, lanthanum, zirconium and titanium (PLZT) constituents. The disclosure of Dougherty U.S. Pat. No. 5,545,184 and Dougherty et al. U.S. patent application Ser. No. 08/688,883 now U.S. Pat. No. 5,728,138 are incorporated herein by reference.

For capacitors which employ PLZT antiferroelectric ceramics, there is a need to achieve cost savings in their production by use of less expensive contact electrodes. For instance, certain PLZT antiferroelectric ceramics require application of sintering temperatures in the range of 1300–1350° C. to achieve desired levels of densification. At such temperatures, platinum is the favored electrode material and adds substantially to the expense of the capacitor.

The prior art teaches that inorganic lithium compounds have been used as additives to ferroelectric ceramics to reduce the firing temperatures thereof. For instance, lithium salts have been used to lower the sintering temperature of various perovskite systems, especially $BaTiO_3$, e.g., see Haussonne et al., "Barium Titanate Perovskite Sintered with Lithium Fluoride", Journal of the American Ceramic Society, Volume 66, No. 11, pp 801–807 (1983). Haussonne et al. found that when lithium fluoride and other lithium salts (lithium carbonate, lithium nitrate and lithium chloride) are added to barium titanate, the required sintering temperatures are lowered, as compared to barium titanate without lithium additions.

Laurent et al., "Sintering of Strontium Titanate in the Presence of Lithium Salts in a Reduced Atmosphere", Journal of Material Science, Vol. 23, pages 4481–4486 (1988) show that the addition of lithium salts reduce the sintering temperature of strontium titanate.

Fu and Chen, "Low Firing Dielectrics in the System $Pb(Fe_{2/3}W_{1/3})_x(Fe_{1/2}Nb_{1/2})_{0.9-x}Ti_{0.1}O_3$—$Bi_2O_3/Li_2O$", International Journal for Hybrid Microelectronics, Volume 10, No. 4, pages 1–5 (1987), studied the effect of bismuth oxide and lithium oxide on the sintering of the lead-based perovskite system: $Pb(Fe_{2/3n}W_{1/3})_x(Fe_{1/2}Nb_{1/2})_{0.9-x}Ti_{0.1}O_3$. It was observed that the addition of bismuth oxide/lithium oxide resulted in a sintering of the aforementioned ceramic at 850° C. and a shifting of its Curie peak from 37° C. to 10° C.

Halmi et al. in "Improved Lead Perovskite Compounds (PFM-PFT) for Z5U Capacitor Applications" Advanced Ceramic Materials, Volume 3, No. 1, pages 32–37 (1988) observe that the addition of lithium enhances the sintering ability and dielectric permittivity of the ceramic. Each of the aforementioned teachings involved addition of a lithium salt to a ferroelectric ceramic, with the result being a lowering of the firing temperature.

Megherhi in a PhD thesis entitled "Interaction Studies of Lead Magnesium Niobate-based Capacitor Materials with Integrated Ceramic Packaging" (May 1991) found that the addition of lithium nitrate to lead magnesium niobate/lead titanate and lead magnesium niobate/lead zinc niobate relaxor perovskites enables a densification of the aforesaid ceramic materials at lowered sintering temperatures.

It is an object of this invention to provide an improved method for firing PLZT antiferroelectric ceramics.

It is another object of this invention to provide an addition to a PLZT ceramic which enables the firing thereof at a lower temperature than heretofore required.

SUMMARY OF THE INVENTION

A method for densifying a dielectric antiferroelectric ceramic material includes the steps of adding a compound which includes lithium to the ceramic material to create a mixture thereof. Thereafter, the mixture is heated to a temperature of not greater than about 1100° C. for a predetermined period to densify the mixture. It is preferred that the lithium compound be a lithium salt and that the ceramic material comprise a PLZT composition. The resulting ceramic composition is well suited for use in capacitors that are incorporated into defibrillator units.

DETAILED DESCRIPTION OF THE PREFERRED EMBODIMENT

It has been determined that an addition of a lithium salt to a PLZT composition, exhibiting an antiferroelectric phase, enables a substantial reduction in the sintering temperature required to fully densify the PLZT ceramic. Without an addition of a lithium salt, densification of a PLZT antiferroelectric ceramic requires a sinter temperature of 1320° C., applied for two hours. A densified PLZT ceramic, sintered in accordance with the prior art, was configured as a capacitor by Applicants and tested to determine a level of energy density which could be stored. It was determined that, given an applied electric field of 300 kilovolts/centimeter, that an energy density of 4.5 Joules per cubic centimeter was achieved.

The identical PLZT compound was then modified by an addition of a lithium salt in accordance with the invention and it was found that the firing temperature could be reduced to as low as 1000° C. for two hours, while still achieving approximately equal energy storage values, for equivalent applied electric fields.

It was determined that the addition of lithium to the PLZT antiferroelectric material reduced (i) the required firing temperature to about 1100° C. or less; (ii) resulted in approximately equal levels of energy density storage and (iii) did not affect the PLZT in an environment wherein high electric fields are applied.

Prior to Applicants' experiments, it could not be predicted that the addition of lithium to a PLZT composition would not affect the level of electric field which could be accommodated across a densified substrate. Furthermore, because of the difference in crystalline structure between ferroelectric PLZTs and antiferroelectric PLZTs, it could not be predicted, with certainty, that an addition of lithium to a PLZT antiferroelectric composition would not affect the crystalline structure of the densified substrate or that it would, of necessity, change the firing characteristics thereof.

To demonstrate that a lithium addition to a PLZT antiferroelectric composition results in a lower required firing temperature, an 8/95/5 PLZT was employed. As known to those skilled in the art, the "8" value equates to the molar percent of lanthanum with respect to lead, the "95" equates to the molar percent of zirconium with respect to titanium, and the "5" equates to the molar percent of titanium with respect to zirconium.

The test results from the 8/95/5 PLZT family establish that substantially equivalent firing/energy storage results occur with antiferroelectric PLZTs exhibiting molar percentages as follows:

L: from approximately 1 to 10;
Zr: from approximately 90 to 100; and
Ti: from approximately 0 to 10.

Figure 1:
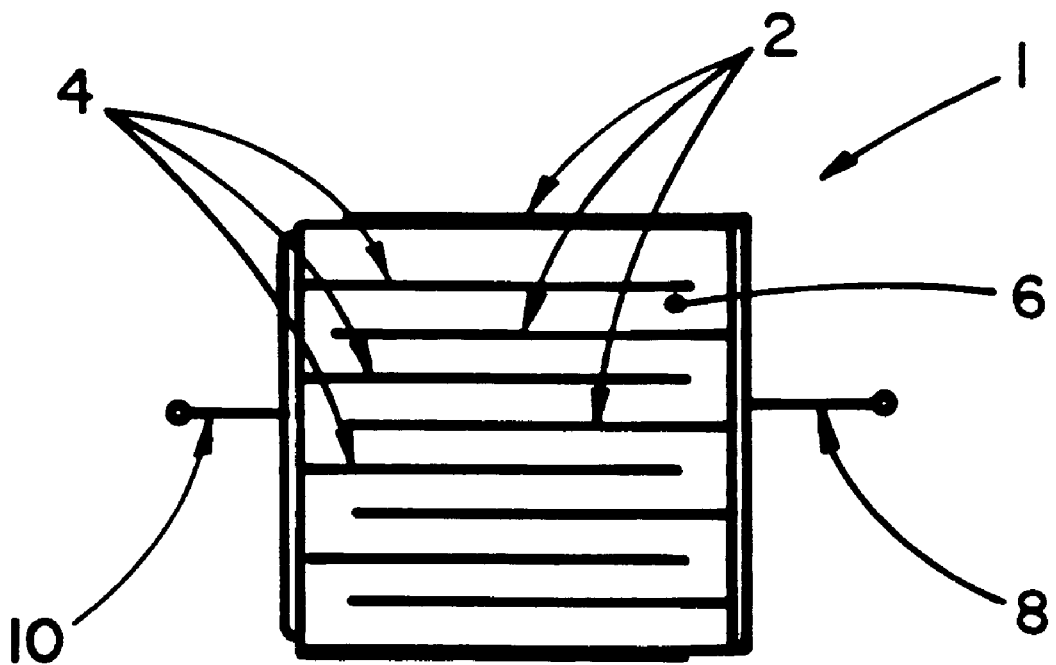
FIG. 1 illustrates a multilayer capacitor which utilizes a ceramic composition dielectric that is configured in accord with the invention hereof.

PLZT ceramics configured in accord with the above teaching are particularly useful in multilayer capacitors that are used in implantable cardiac defibrillators. Such a multilayer capacitor 1 is schematically illustrated in FIG. 1 and comprises plural interdigitated conductive layers 2 and 4 that are separated by PLZT ceramic layers 6. End conductors 8 and 10 make contact with conductor layers 2 and 4, respectively, and enable connection thereto.

Figure 2:
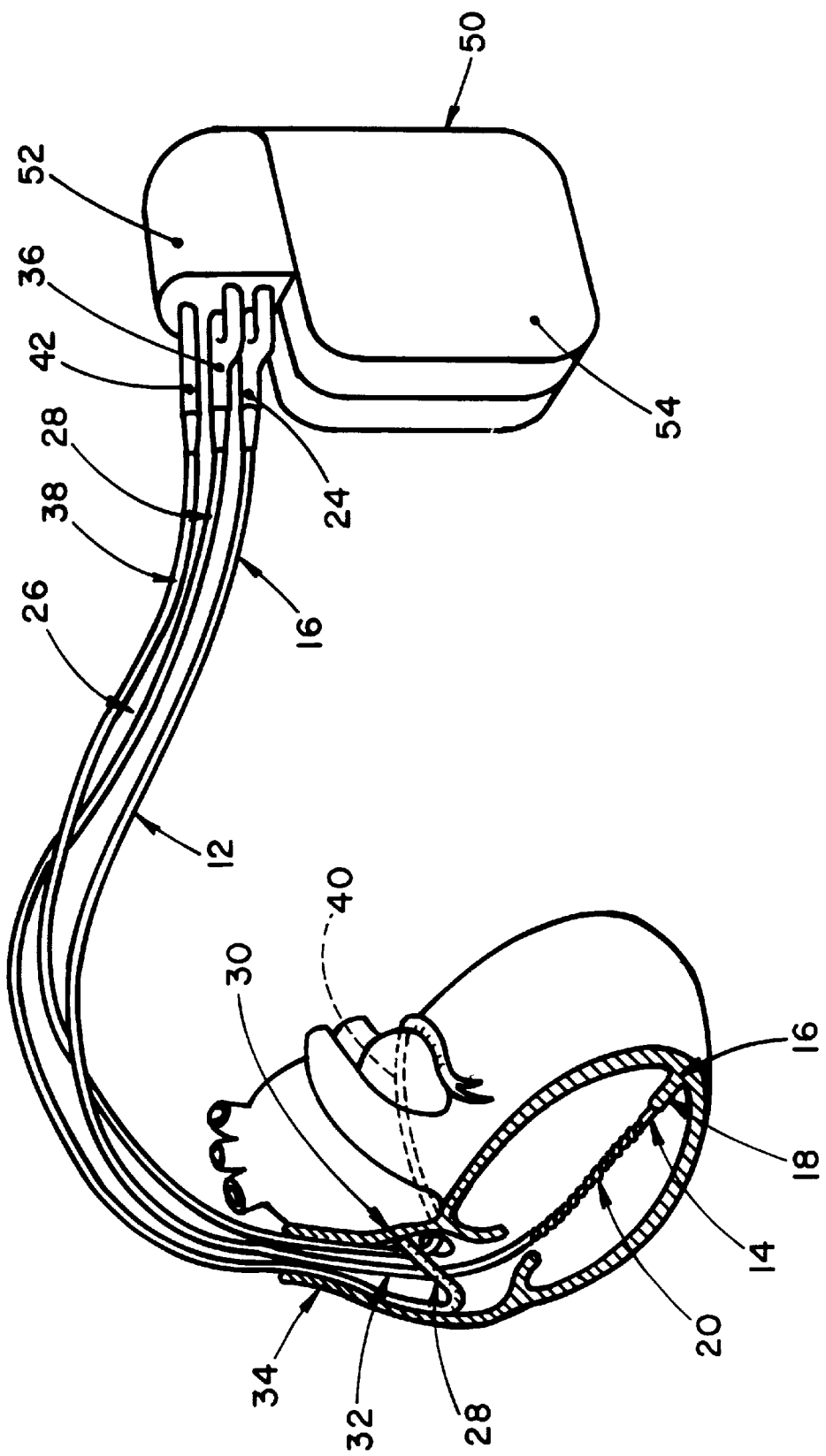
FIG. 2 illustrates a defibrillator and lead set that utilizes one or more capacitors constructed in accord with the invention.

FIG. 2 illustrates a defibrillator and lead set which incorporates one or more capacitors 1. Ventricular lead 12 includes an elongated insulative lead body 16, carrying three concentric coiled conductors, separated from one another by tubular insulative sheaths. Located adjacent the distal end of ventricular lead 12 is a ring electrode 14, an extendible helix electrode 16 mounted retractably within an insulative electrode head 18, and an elongated coil electrode 20. Each of the electrodes is coupled to one of the coiled conductors within lead body 16. Electrodes 14 and 16 are employed for cardiac pacing and for sensing ventricular depolarizations.

At the proximal end of ventricular lead 12 is a bifurcated connector 24 which carries three electrical connectors, each coupled to one of the coiled conductors. Defibrillation electrode 20 may be fabricated from platinum, platinum alloy or other materials known to be usable in implantable defibrillation electrodes and may be about 5 cm in length.

An atrial/SVC lead 26 includes an elongated insulative lead body 28, carrying concentric coiled conductors, separated from one another by tubular insulative sheaths, corresponding to the structure of ventricular lead 12. Located adjacent the J-shaped distal end of lead 26 are a ring electrode 28 and an extendible helix electrode 30, mounted retractably within an insulative electrode head 32. Each of the electrodes is coupled to one of the coiled conductors within the lead body 28. Electrodes 28 and 30 are employed for atrial pacing and for sensing atrial depolarizations.

An elongated coil electrode 34 is provided proximal to electrode 21 and is coupled to the third conductor within the lead body 28. Electrode 34 preferably is 10 cm in length or greater and is configured to extend from the SVC toward the tricuspid valve. In one preferred embodiment, approximately 5 cm of the right atrium/SVC electrode is located in the right atrium, with the remaining 5 cm located in the SVC.

At the proximal end of lead 28 is a bifurcated connector 36 which carries three electrical connectors, each coupled to one of the coiled conductors.

The coronary sinus lead includes an elongated insulative lead body 38, carrying one coiled conductor, coupled to an elongated coiled defibrillation electrode 40. Electrode 40, illustrated in broken outline, is located within the coronary sinus and great vein of the heart. At the proximal end of the lead is a connector plug 42 which carries an electrical connector, coupled to the coiled conductor. The coronary sinus/great vein electrode 8 may be about 5 cm in length.

Implantable pacemaker/cardioverter/defibrillator module 50 is shown in combination with the leads, and with lead connector assemblies 24, 36 and 42 inserted into a connector block 52. Optionally, insulation of the outward facing portion of housing 54 of the pacemaker/cardioverter/defibrillator 50 may be provided using a plastic coating, for example parylene or silicone rubber, as is currently employed in some unipolar cardiac pacemakers. However, the outward facing portion may instead be left uninsulated, or some other division between insulated and uninsulated portions may be employed. The uninsulated portion of the housing 54 optionally serves as a subcutaneous defibrillation electrode, used to defibrillate either the atria or ventricles. Other lead configurations and electrode locations may of course be substituted for the lead set illustrated. For example, atrial defibrillation and sensing electrodes might be added to either the coronary sinus lead or the right ventricular lead instead of being located on a separate atrial lead, thereby allowing for a two-lead system. Within module 50, one or more capacitors 1 and battery(s) are included to enable a defibrillation action to be accomplished.

EXPERIMENTAL

It will be noted from some of the results given below, that certain fired samples exhibited low electric field and energy density values. Those values were the result of insufficient control of particle size distribution of the PLZT ceramic powder. More specifically, a variability in particle size causes the lithium addition to have a non-uniform effect over the entire volume of the fired ceramic. As a result, certain tested samples broke down at relatively low field values and, thus, showed poor energy densities. Nevertheless, for completeness sake, both successful and unsuccessful test results are represented.

Two series of experiments were run, one with a combination of PLZT (8/95/5) with different weight percents of lithium nitrate in alcohol and another with PLZT 8/95/5 plus a weight percent of lithium nitrate in water. In both cases, 100 grams of PLZT 8/95/5 powder were mixed with a given weight percent of lithium nitrate and then combined with either alcohol (about 40 grams) or a solution of 30 grams of water, 1 gram of ammonium hydroxide and 5 grams of Tamol. The ammonium hydroxide acted as a pH adjustment and the Tamol acting as a dispersant. The respective mixtures were then milled in a Sweco vibratory mill for 20 hours and then were sintered. The resulting densified ceramic substrates were tested for energy density storage capability by the application of an electric field thereacross, followed by a discharge through a standard resistance. The monitoring of the voltage across the resistance, over time, enabled calculation of the energy density of the respective ceramic substrates. The results are given in table 1 below:

TABLE I

| Wt. % LiNO$_3$ | Temp. (° C.)/ Time | Electric Field (kV/cm)/ Energy Density (J/cc) | |
|---|---|---|---|
| | | alcohol | water |
| 0 | 1320/2 hrs | 300/4.50 | |
| 0.84 | 1100/2 hrs | 149/0.75 | 149/0.84 |
| | 1100/12 hrs | 301/s.1s | 191/1.45 |
| 1.0 | 1100/12 hrs | 254/3.33 | 246/2.65 |
| 2.0 | 1950/12 hrs | 215/1.73 | 175/1.03 |
| | 1100/2 hrs | 145/0.51 | 169/1.07 |
| 3.0 | 1000/2 hrs | 354/4.45 | 262/2.39 |
| | 1000/12 hrs | 191/0.84 | 208/1.65 |

Note that weight percents of 0.84 and 3.0 of lithium nitrate enabled a firing of the PLZT (8/95/5) substrate for two hours at 1100° C. and 1000° C., respectively. The resulting fired substrates then exhibited substantially similar electric field and energy density values as the PLZT 8/95/5 sample which had no lithium added and was fired at 1320° C. for two hours. Note further that the samples prepared, using an alcohol base showed better characteristics than those using the water base. However, with revisions to the pH of the water/ceramic mixtures, improved electric field/energy density characteristics can be achieved.

While not shown above, tests were run wherein higher percentages of lithium nitrate were added to the PLZT (8/95/5), however, additional firing temperature improvements were not seen at such levels.

The ability to fire a PLZT antiferroelectric material at the above indicated temperatures (at about 1100° C. or less) enables the use of a silver palladium co-fired alloy as the metallization. At higher temperatures, a platinum metallization is required. Further, the lower sintering temperature allows for greater control of lead loss characteristics of the PLZT materials.

While the above experiments were carried out with a lithium nitrate addition, other lithium salts, e.g. lithium carbonate, lithium acetate, etc. can be utilized to achieve the same reduction in firing temperature. The optimum amount of lithium is found empirically for each lead-based antiferroelectric compound. A typical amount of added lithium compound is in the range of 0.5–10.0 weight percent addition.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for densifying an antiferroelectric dielectric material, said dielectric material comprising lead, lanthanum, zirconium and titanium (PLZT) constituents in molar percentages as follows:
    La: from approximately 1 to approximately 10;
    Zr: from approximately 90 to approximately 100; and
    Ti: from approximately 0 to approximately 10,
said method comprising the steps of:
    a) adding a compound which includes a lithium salt to said dielectric material to create a mixture thereof and to reduce a required firing temperature thereof to not greater than about 1100° C.; and
    b) heating said mixture to a temperature of not greater than about 1100° C. for a determined period to densify said mixture.

2. The method as recited in claim 1 wherein said lanthanum, zirconium and titanium constituents are present in the dielectric in molar percentages of 8/95/5.

3. The method as recited in claim 1 wherein said mixture in step a) further includes alcohol.

4. The method as recited in claim 1 wherein said mixture in step a) further includes water.

5. The method as recited in claim 1 wherein said step a) comprises an addition of a lithium salt in the range of 0.5–10.0 weight percent addition.

6. A method for making a multilayer capacitor, said method comprising the steps of:
    a) adding a compound which includes lithium salt to an antiferroelectric dielectric material to create a mixture thereof and to reduce a required firing temperature thereof to not greater than about 1100° C., said dielectric material comprising lead, lanthanum, zirconium and titanium (PLZT) constituents in molar percentages as follows:
    La: from approximately 1 to approximately 10;
    Zr: from approximately 90 to approximately 100; and
    Ti: from approximately 0 to approximately 10;
    b) alternating layers of said mixture and conductive layers to create a capacitor body; and
    c) heating said capacitor body to a temperature of not greater than about 1100° C. for a determined period to densify said mixture.

7. The method as recited in claim 6 wherein said lanthanum, zirconium and titanium constituents are present in the dielectric in molar percentages of 8/95/5.

8. The method as recited in claim 6 wherein said mixture in step a) further includes alcohol.

9. The method as recited in claim 6 wherein said mixture in step a) further includes water.

10. The method as recited in claim 6 wherein said step a) comprises an addition of a lithium salt in the range of 0.5–10.0 weight percent addition.

11. A capacitor made in accord with the method of claim 6.

12. A cardiac defibrillator including a capacitor made in accord with the method of claim 6.

* * * * *